(12) United States Patent
Yakimishyn

(10) Patent No.: US 6,997,464 B2
(45) Date of Patent: Feb. 14, 2006

(54) LIFT AXLE SUSPENSION

(76) Inventor: Kelly William Yakimishyn, 13920-20 St., Edmonton, Alberta T5Y 1PB (CA)

(*) Notice: Subject to any disclaimer, the term of this patent is extended or adjusted under 35 U.S.C. 154(b) by 103 days.

(21) Appl. No.: 10/422,922

(22) Filed: Apr. 23, 2003

(65) Prior Publication Data
US 2004/0051261 A1    Mar. 18, 2004

(51) Int. Cl.
B60G 17/052    (2006.01)

(52) U.S. Cl. .................. 280/6.159; 280/86.5

(58) Field of Classification Search .............. 280/86.5, 280/124.116, 124.157, 124.16, 6.157, 6.159, 280/5.514; 180/24.02, 209
See application file for complete search history.

(56) References Cited

U.S. PATENT DOCUMENTS

| | | | |
|---|---|---|---|
| 3,096,995 A | 7/1963 | Richnow, Jr. ............. 280/104.5 |
| 3,201,141 A * | 8/1965 | Bernstein et al. .......... 280/86.5 |
| 3,694,001 A | 9/1972 | McGee ..................... 280/124 |
| 3,771,617 A * | 11/1973 | Hornung .................. 280/86.5 |
| 4,000,913 A | 1/1977 | Gibson ..................... 280/704 |
| 4,171,830 A * | 10/1979 | Metz ....................... 280/86.5 |
| 4,252,340 A | 2/1981 | Egging ..................... 280/682 |
| 4,256,326 A | 3/1981 | Cantrell et al. ............ 280/683 |
| 4,284,156 A * | 8/1981 | Carstensen et al. ........ 180/24.02 |
| 4,293,145 A | 10/1981 | Taylor ...................... 280/704 |
| 4,854,409 A * | 8/1989 | Hillebrand et al. ....... 180/24.02 |
| 4,944,526 A * | 7/1990 | Eberling .................... 280/86.5 |
| 5,018,593 A | 5/1991 | Hermann ................. 180/24.02 |
| 5,230,528 A | 7/1993 | VanRaden et al. .......... 280/704 |
| 5,403,031 A | 4/1995 | Gottschalk et al. ......... 280/704 |
| 5,549,322 A | 8/1996 | Hauri ....................... 280/704 |
| 5,655,788 A | 8/1997 | Peaker ..................... 280/711 |
| 6,003,885 A | 12/1999 | Richardson ............... 280/86.5 |
| 6,158,750 A | 12/2000 | Gideon et al. ............ 280/86.5 |
| 6,398,236 B1 | 6/2002 | Richardson ............... 280/86.5 |
| 6,416,069 B1 | 7/2002 | Ramsey ............... 280/124.116 |

OTHER PUBLICATIONS

Neway Anchorlok Suspensions, Internet printout, 3 pages, dated Mar. 4, 2005, http://www.scientificbrake.com/truckeq/suspensions/Neway.htm.

www.NTIS.gov, Evalution of the Lift Axle Regulation (WAC 468.38.280) in Washington, Washington State Transportation Center, Pullman, Jun., 1994, 155 Pages.

* cited by examiner

*Primary Examiner*—David R. Dunn
(74) *Attorney, Agent, or Firm*—Christensen O'Connor Johnson Kindness PLLC

(57) ABSTRACT

A lift axle suspension includes an axle and a first suspension air bag acting one of directly or indirectly in a downward direction upon the axle. A lever is provided having a first end, a second end, and a fulcrum selectively positioned between the first end and the second end. The first end is linked to the axle. A second lift air bag acts in a downward direction upon the second end of the lever. This causes the lever to pivot about the fulcrum such that the first end of the lever, which is linked to the axle, is raised. An air diverter selectively supplies air to either the first suspension air bag to lower the axle or the second lift air bag to raise the axle.

7 Claims, 3 Drawing Sheets

US 6,997,464 B2

LIFT AXLE SUSPENSION

FIELD OF THE INVENTION

The present invention relates to a lift axle suspension.

BACKGROUND OF THE INVENTION

There are numerous examples of lift axle suspensions in the patent literature, including: U.S. Pat. No. 3,201,141 (Bernstein (1965); U.S. Pat. No. 4,000,913 (Gibson 1977); U.S. Pat. No. 4,256,326 (Cantrell et al 1981); U.S. Pat. No. 5,403,031 (Gottschalk et al 1995); U.S. Pat. No. 5,549,322 (Hauri 1996); U.S. Pat. No. 5,655,788 (Peaker 1997) and U.S. Pat. No. 6,416,069 (Ramsey 2002).

The use of a lift axle suspension enables a driver of a vehicle to lift one or more axles in order to selectively transfer more weight to the tires that remain on the ground. This may be done when the vehicle is loaded in order to increase traction or provide more controlled braking. This may be done when the vehicle is not loaded in order to save tire wear.

SUMMARY OF THE INVENTION

The present invention is an alternative lift axle suspension that is believed to provide advantages by virtue of its relative simplicity.

According to the present invention there is provided a lift axle suspension that includes a pivoting arm, an axle and a first suspension air bag acting one of directly or indirectly in a downward direction upon the axle. A lever is provided having a first end, a second end, and a fulcrum positioned between the first end and the second end. The first end is linked to the axle. A second lift air bag acts in a downward direction upon the second end of the lever. This causes the lever to pivot about the fulcrum such that the first end of the lever, which is linked to the axle, is raised. Means is provided for selectively supplying air to either the first suspension air bag to lower the axle or the second lift air bag to raise the axle.

The above described lift axle suspension is characterized by the use of a second air bag to exert a force upon a lever causing the lever to pivot about its fulcrum and lift the axle. It provides a distinct advantage over spring biased systems which have an inherent imbalance in weight distribution as a result of the action of the biasing spring.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
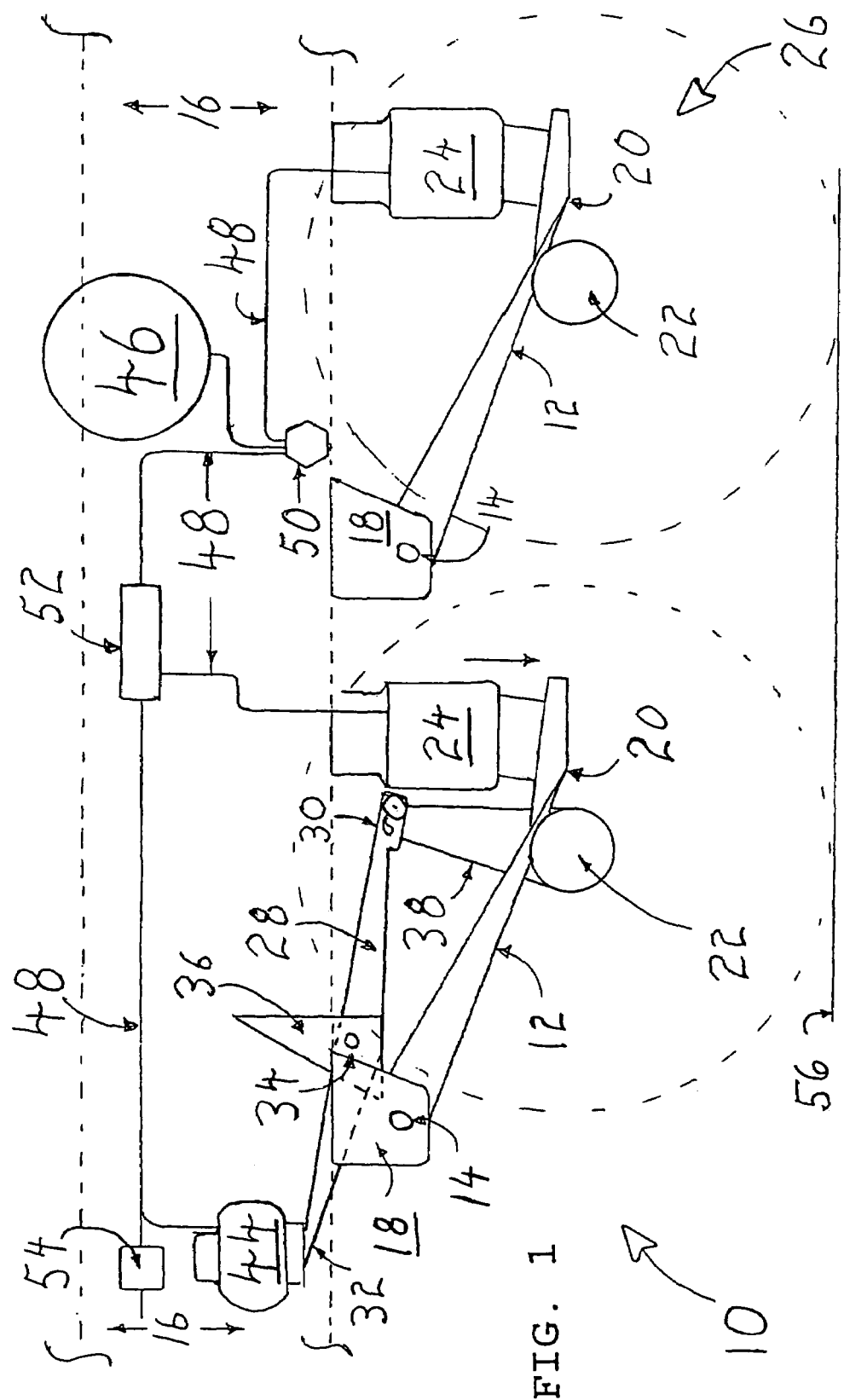
FIG. 1 is a side elevation view of a lift axle assembly constructed in accordance with the teachings of the present invention, with the axle in a lowered position.

The preferred embodiment, a lift axle suspension generally identified by reference numeral 10, will now be described with reference to FIGS. 1 through 3.

Figure 2:
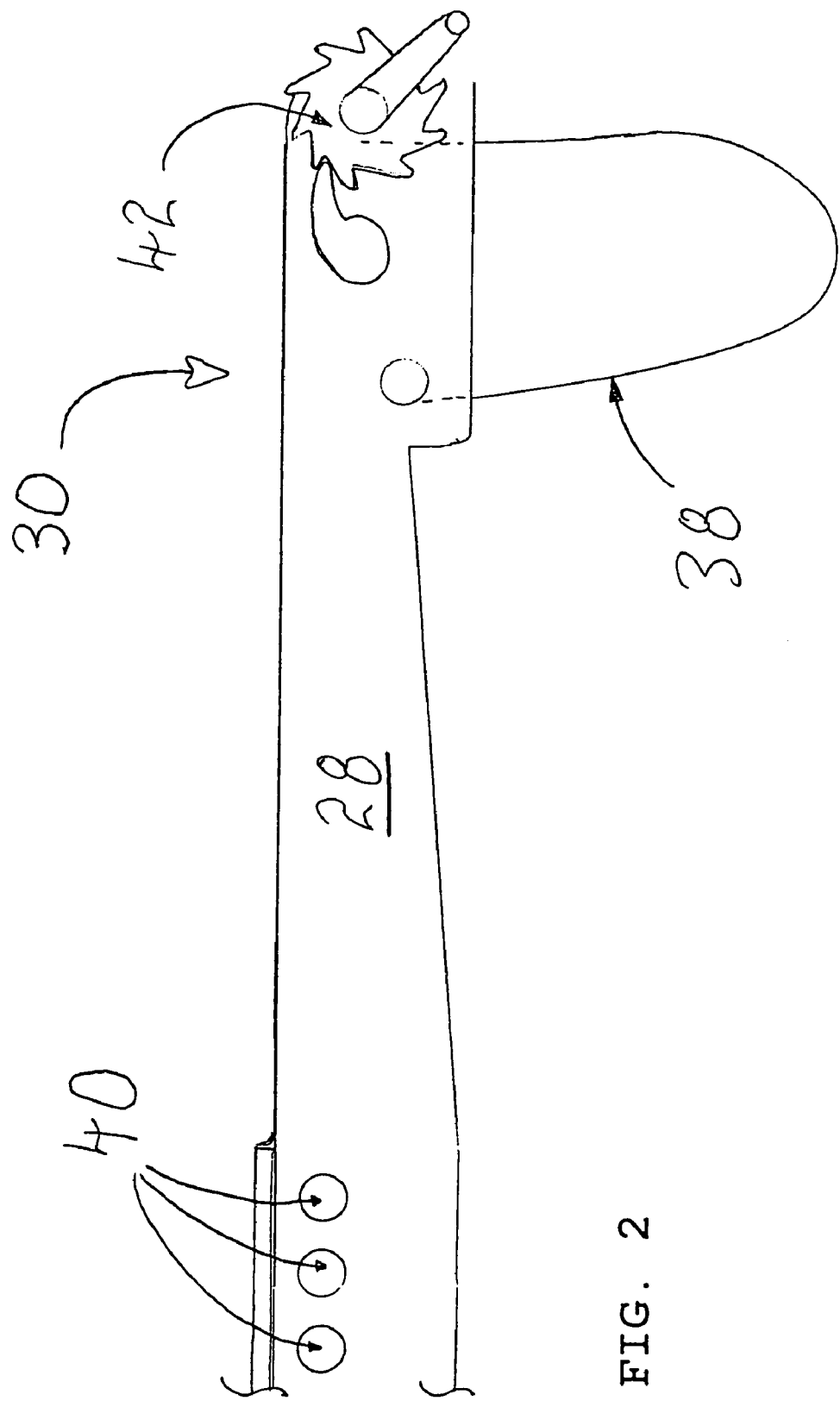
FIG. 2 is a detail, partial side elevation view of the fulcrum and first end of a lever as illustrated in FIG. 1.

Structure and Relationship of Parts:

Referring to FIG. 1, pivot arm 12 having pivotal end 14 that is pivotally attached to vehicle frame 16 by pivotarm bracket 18. Remote end with adapter 20 is attached to axle with wheels 22 and is actuated by first suspension air bag 24 shown in extended mode. All elements 12 through 24 are shown as basic lift axle suspension 26. Preferred embodiment 10 comprises lever 28 having a first end 30 and second end 32 which rotates about fulcrum 34 which is attached to frame 16 by lever bracket 36. An adjustable sling 38 adapts first end 30 to axle with wheel 22. Referring to FIG. 2, lever 28 is further adapted with a plurality of adjustably positioned fulcrum points 40 and a sling adjusting mechanism 42. Referring to FIG. 1, second end 32 is actuated by second lift air bag 44 shown in deflation mode. Air supply 46 provides pressure through connection hoses 48. Pressurized air is channelled through load leveller valve 50 to air diverter 52 and regulator 54.

Figure 3:
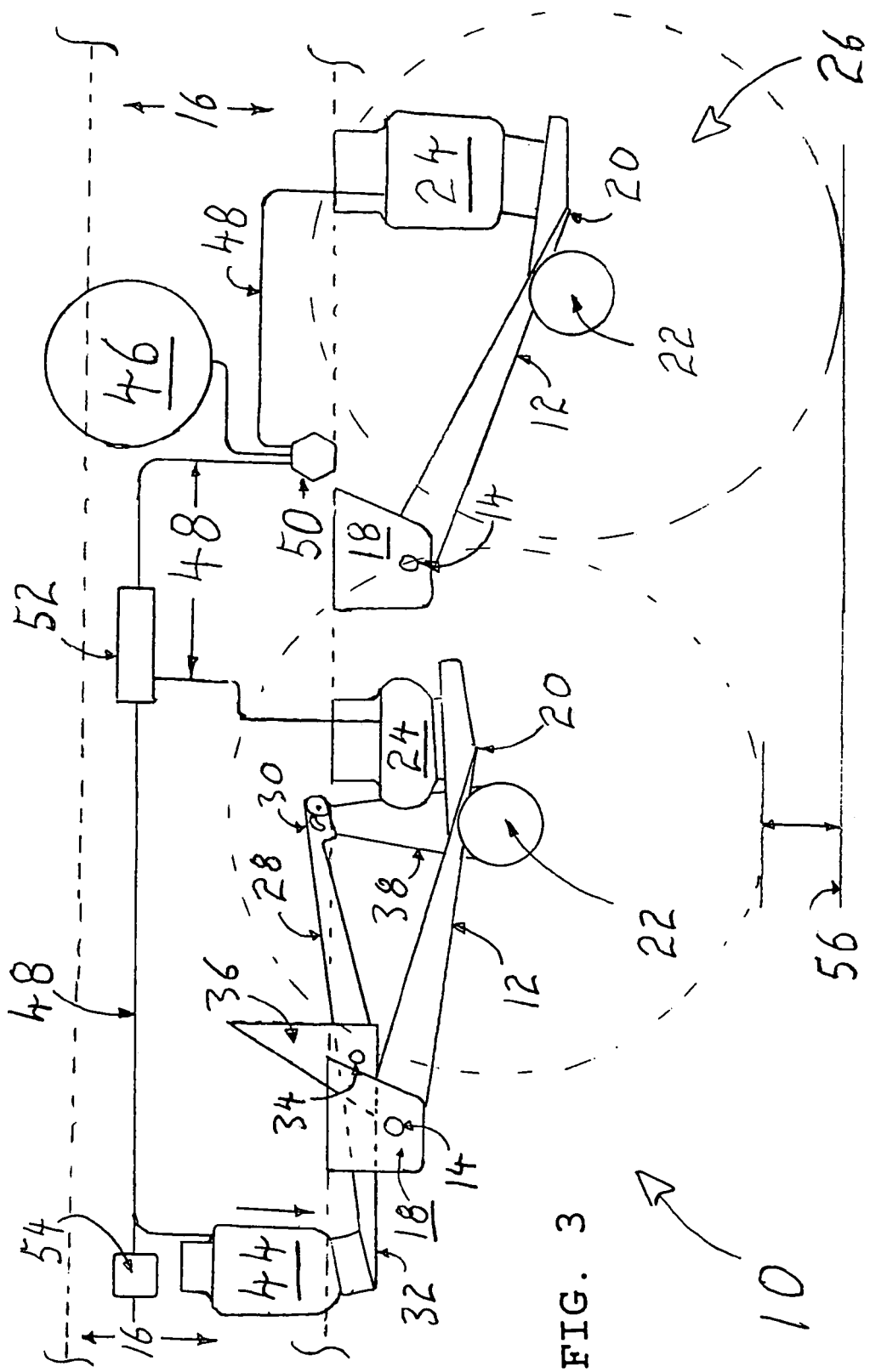
FIG. 3 is a side elevation view of the lift axle assembly illustrated in FIG. 1, with the axle in a raised position.

Referring to FIG. 3, axle with wheels 22 is shown in the elevated position relative to any other axle with wheels at ground level 56. Second lift air bag 44 is now shown in extension mode and first suspension air bag 24 is now shown in deflation mode.

Operation:

The use and operation of a lift axle suspension generally identified by reference numeral 10, will now be described with reference to FIGS. 1 through 3. The weight and contact height of select axles with wheels 22 in multiple, tandem-axle type vehicles may be changed by changing the settings of load leveller valve 50, air diverter 52 and regulator 54. Depending on the need, air will be diverted to second lift air bag 44 which in turn actuates second end 32 of lever 28 causing lever 28 to rotate about the fulcrum 34 and, in turn, lift first end 30. First end 30 then exerts upward pressure on adjustable sling 38, lifting axle with wheel 22 which, in turn, lifts remote end with adapter 20 which is now able to place first suspension air bag 24 in deflation mode. The result is an elevated wheel position relative to ground level 56 such that the tires on axles with wheels 22 that are part of lift axle suspensions 10 are conserved. Further, should the need to adapt the lift axle suspension 10 to a different vehicle, an operator may select one of adjustably positioned fulcrum points 40 and adjust the sling by operating sling adjustment mechanism 42.

The operation of the above described lift axle suspension can be manual or automatic. Some jurisdictions do not allow operators of multiple, tandem-axle type vehicles to manually operate a lift axle suspension at his or her own discretion. The reason that laws were passed in such jurisdictions is due to abuses in the past, where operators were exceeding legal load limits. The lift axle suspension, as illustrated in FIGS. 1 through 3, may be actuated by means of an automatic system having predetermined settings. This is accomplished by having the diverter automatically make a selected diversion in response to air pressure. When air pressure is below a preset level, the axle is lifted. When air pressure is above a preset level, the axle is lowered.

With the lift axle arrangement described above, the air bag suspension will not operate properly if the axle is lifted when the suspension system is under load. The reason for this is that air pressure provided to the air bags is limited by regulator 54 to a pre-selected setting within a range of 15 p.s.i. to 30 p.s.i. The preset pressure level is sufficient for the air suspension system to operate when the trailer is travelling down the highway without a load. When the trailer is under load, greater air pressure than 15 p.s.i. to 30 p.s.i. is required in the air bags in order for the air suspension system to provide operating clearance. This greater air pressure is never achieved as regulator 54 will keep exhausting air to maintain its preset pressure level.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A lift axle suspension, comprising:
    an axle;
    a first suspension air bag connected to an air suspension system and acting one of directly or indirectly in a downward direction upon the axle;
    a lever having a first end, a second end, and a selectively positioned fulcrum between the first end and the second end, the first end being linked to the axle;
    a second lift air bag acting in a downward direction upon the second end of the lever, thereby causing the lever to pivot about the fulcrum such that the first end of the lever which is linked to the axle is raised;
    means for selectively supplying air to either the first suspension air bag to lower the axle or the second lift air bag to raise the axle; and
    a regulator to regulate air pressure within the air suspension system, the regulator being set at a pressure level that allows pressure to be increased to lift the suspension to provide clearance and then raise the axle without a load, but releases excess air pressure in order to prevent pressure to be increased to lift the suspension and raise the axle when under load.

2. The lift axle suspension as defined in claim 1, wherein the first end of the lever is linked to the axle by an adjustable sling.

3. The lift axle suspension as defined in claim 1, wherein the means for selectively supplying air is configured to automatically supply air, based on air pressure, to either the first suspension air bag to lower the axle or the second lift air bag to raise the axle.

4. The lift axle suspension as defined in claim 1, wherein the axle is secured to a pivoting arm and the first suspension air bag acts upon the axle via the pivoting arm.

5. A lift axle suspension, comprising:
    a pivoting arm having a pivotal attachment end and a remote end;
    an axle secured to the remote end of the pivoting arm;
    a first suspension air bag connected to an air suspension system and acting in a downward direction upon the axle via the pivoting arm;
    a lever having a first end, a second end, and a fulcrum selectively positioned between the first end and the second end, the first end being linked to the axle by an adjustable sling;
    a second lift air bag acting in a downward direction upon the second end of the lever, thereby causing the lever to pivot about the fulcrum such that the first end of the lever which is linked to the axle is raised;
    an air supply tank for supplying air via connection hoses;
    a load leveller valve for maintaining a level of a vehicle;
    an air diverter for selectively diverting air from the air supply tank to either the first suspension air bag to lower the axle or the second lift air bag to raise the axle; and
    an air regulator for regulating air pressure within the air suspension system, the regulator being set at a pressure level that allows pressure to be increased to lift the suspension to provide clearance and then raise the axle without a load, but releases excess air pressure in order to prevent pressure to be increased to lift the suspension and raise the axle when under load.

6. The lift axle suspension as defined in claim 5, wherein the air diverter responds to air pressure to automatically selectively divert air to the first suspension air bag or the second lift air bag.

7. A lift axle suspension, comprising:
    an axle;
    a suspension air bag acting directly or indirectly in a downward direction upon the axle;
    a lift air bag acting directly or indirectly to lift the axle;
    means for selectively supplying air from an air suspension system of a vehicle to either the suspension air bag to lower the axle or the lift air bag to raise the axle; and
    a regulator to regulate air pressure in the air suspension system, the regulator being set at a pressure level that allows pressure to be increased to lift the suspension to provide clearance and then raise the axle without a load, but releases excess air pressure in order to prevent pressure to be increased to lift the suspension and raise the axle when under load.

* * * * *